US008788618B2

(12) United States Patent
Mohammed et al.

(10) Patent No.: US 8,788,618 B2
(45) Date of Patent: Jul. 22, 2014

(54) LEVERAGING PRESENCE SERVICE SYSTEM AND METHOD FOR DISTRIBUTED WEB SERVICE DELIVERY AND DEPLOYMENT

(75) Inventors: Aziz Mohammed, Plano, TX (US); Vinaitheerthan Sundaram, West Lafayette, IN (US)

(73) Assignee: Alcatel Lucent, Boulogne Billancourt (FR)

( * ) Notice: Subject to any disclaimer, the term of this patent is extended or adjusted under 35 U.S.C. 154(b) by 867 days.

(21) Appl. No.: 11/245,685

(22) Filed: Oct. 7, 2005

(65) Prior Publication Data

US 2007/0083627 A1   Apr. 12, 2007

(51) Int. Cl.
*G06F 15/16*   (2006.01)
*G06F 15/173*   (2006.01)

(52) U.S. Cl.
USPC .......................................... 709/218; 709/223

(58) Field of Classification Search
USPC .......................................... 709/218, 223–226
See application file for complete search history.

(56) References Cited

U.S. PATENT DOCUMENTS

| 2002/0116479 | A1* | 8/2002 | Ishida et al. ................... 709/220 |
| 2002/0143819 | A1* | 10/2002 | Han et al. ........................ 707/513 |
| 2003/0195813 | A1* | 10/2003 | Pallister et al. ................. 705/26 |
| 2003/0220835 | A1 | 11/2003 | Barnes, Jr. |
| 2004/0176988 | A1* | 9/2004 | Boughannam ................... 705/4 |
| 2005/0049937 | A1 | 3/2005 | Sanders |
| 2006/0095577 | A1* | 5/2006 | Childress et al. ............. 709/229 |
| 2007/0036135 | A1* | 2/2007 | Patron et al. ................... 370/352 |
| 2007/0150941 | A1* | 6/2007 | Jachner ............................ 726/5 |
| 2007/0168490 | A1* | 7/2007 | Kent et al. ..................... 709/223 |
| 2007/0250611 | A1* | 10/2007 | Bhogal et al. ................. 709/223 |

FOREIGN PATENT DOCUMENTS

| EP | 1548626 A1 | 6/2005 |
| WO | 03047203 A1 | 6/2003 |

OTHER PUBLICATIONS

Technology White Paper "Rich Presence: A New User Communications Experience" 8 pages, copyrighted 1st quarter 2005.
J. Rosenberg "A Data model for Presence", draft-ietf-simple-data-model-05, Sep. 22, 2005, pp. 1-35.
J. Rosenberg "A Presence Event Package for the Session Initiation Protocol (SIP)", RFC 3856, Aug. 2004, pp. 1-28.
H. Shulzerine et al RPID: Rich Presence Extensions to the Presence Information Data Format (PIDF), draft-ietf-simple-rpid-08, Jul. 16, 2005, pp. 1-41.
J. Rosenberg "Presence Authorization Rules", draft-ietf-simple-presence-rules-03, Jul. 20, 2005, pp. 1-27.
PCT Search Report for PCT Patent Application No. PCT/US2006/035910 dated Feb. 12, 2008.

* cited by examiner

*Primary Examiner* — Afshawn Towfighi
(74) *Attorney, Agent, or Firm* — Capitol Patent & Trademark Law Firm, PLLC

(57) ABSTRACT

A method is described herein for optimizing the delivery and deployment of web services to consumers by providing presence information (presence attributes) in addition to business/technical information (if needed) about different web service providers to the consumers so they can select a web service provider based on various important factors such as load, price, location, etc. . . . of the web service. An enhanced web service registry and a presence system are also described herein.

16 Claims, 2 Drawing Sheets

LEVERAGING PRESENCE SERVICE SYSTEM AND METHOD FOR DISTRIBUTED WEB SERVICE DELIVERY AND DEPLOYMENT

BACKGROUND OF THE INVENTION

1. Field of the Invention

The present invention relates in general to a method for optimizing the delivery and deployment of web services to consumers by providing presence information (presence attributes) in addition to business/technical information (if needed) about different web service providers to the consumers so they can select a web service provider based on various important factors such as load, price, location, etc. . . . of the web service.

2. Description of Related Art

The following abbreviations are herewith defined, at least some of which are referred to in the ensuing description of the prior art and the different embodiments of the present invention.

| | |
|---|---|
| AOL | American On-Line |
| HTTP | Hyper Text Transfer Protocol |
| IETF | Internet Engineering Task Force |
| IM | Instant Messaging |
| MSN | Microsoft Network |
| SIMPLE | SIP for IM and Presence Leveraging Extensions |
| SIP | Session Initiation Protocol |
| SOAP | Simple Object Access Protocol |
| UBR | UDDI Business Registry |
| UDDI | Universal Description, Discovery and Integration |
| URL | Uniform Resource Locator |
| XML | Extensible Markup Language |
| WSDL | Web Service Description Language |

Referring to FIG. 1 (PRIOR ART), there is illustrated a block diagram that is used to help explain how a consumer 100 can obtain business/technical information 102 about different web service providers 104 (one shown) from a traditional service registry 106 (e.g., traditional UDDI service registry 106). As shown, the consumer 100 uses a computer 108 (PDA, laptop etc. . . . ) with software loaded therein that can communicate via WSDL with the UDDI service registry 106. And, the web service provider 104 uses equipment 110 (computer, server etc. . . . ) with software loaded therein that can communicate via WSDL with the UDDI service registry 106. The consumer 100, the web service provider 104 and the UDDI service registry 106 communicate with one another via the Internet 112.

In operation, the web service provider 104 registers their company/services with the UDDI service registry 106. In particular, the web service provider 104 can register with the UDDI service registry 106 and publicly list information about their products, services and engagement guidelines. This information is referred to herein as business/technical information 102. Then, the consumer 100 sends a specific search request 114 to the UDDI service registry 106 to obtain business/technical information 102 about relevant web service providers 104. For example, the consumer 100 can send a search request 114 to obtain the business/technical information 102 about web service providers 104 that provide tax planning services. To send the search request 114, the consumer 100 would first need to access the UDDI service registry 106. The consumer 100 can do this today by using anyone of the following URLS:
IBM's UBR Node: http://uddi.ibm.com
Microsoft's UBR Node: http://uddi.microsoft.com
SAP's UBR Node: http://uddi.sap.com
NTT's UBR Node: http://uddi.ntt.com
The UDDI Service Registry 106 is Formed by these Distributed UBR Nodes.

In response to receiving the search request 114, the UDDI service registry 106 sends the business/technical information 102 associated with relevant web service provider(s) 104 to the consumer 100. The consumer 100 selects one of the web service providers 104 and interacts directly thereafter with that web service provider 104. Alternatively, the consumer 100 can select and interact with multiple web service providers 104. FIG. 2 (PRIOR ART) is a diagram that illustrates the situation where multiple consumers 100a, 100b . . . 100n are interacting with one or more web service providers 104a, 104b . . . 104n. As shown, the consumers 100a, 100b . . . 100n can communicate via SOAP over HTTP with their web service providers 104a, 104b . . . 104n. At this point in time, the consumers 100a, 100b . . . 100n and the web service providers 104a, 104b . . . 104n no longer need to utilize the UDDI service registry 106.

It is well known that the web services of these web service providers 104a, 104b . . . 104n may become noticeably slow and may even overwhelm high-end web servers under heavy load conditions. To address this problem, the web service providers 104a, 104b . . . 104n can try to optimize their service delivery by employing load balancing techniques on their server farm. In addition, the web service providers 104a, 104b . . . 104n can replicate their web services at various servers located in different geographical locations in an attempt to handle heavy load conditions. As can be seen, the current solution used to improve the web service performance is performed by only the web service providers 104a, 104b . . . 104n. It would be desirable if the consumer 100a, 100b . . . 100n could also take part in improving the performance of the web services. This need and other needs are addressed by the present invention.

BRIEF DESCRIPTION OF THE INVENTION

The present invention includes a method for optimizing the delivery and deployment of web services to consumers by providing presence information (presence attributes) in addition to business/technical information (if needed) about different web service providers to the consumers so they can select a web service provider based on various important factors such as load, price, location, etc. . . . of the web service. In one embodiment, a service registry (e.g., UDDI service registry) is enhanced with a presence functionality so it can provide business/technical information and presence information (e.g., load, price, location of servers) about different web service providers to consumers so they can select a web service provider. In another embodiment, a presence system is used to provide the presence information (e.g., load, price, location of servers) about different web service providers to consumers while a service registry (e.g., UDDI service registry) is used to provide the business/technical information about different web service providers to the consumers so they can select a web service provider.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

The present invention deals with a method for enabling a consumer to choose a web service based in part on the state of the web service provider which is indicated to the consumer as presence attributes. In this way, the consumer can help the web service provider to improve the delivery and deployment of the web service. This is a marked improvement over the prior art in which only the web service provider could improve the delivery and deployment of the web service. The present invention is enabled by using a presence based application. Presence is defined as notification of events that facilitate communication. Currently, presence technology is being widely deployed in the environment of instant messaging (AOL, Yahoo, MSN, etc.). And, presence technology is being developed as a core communication enabler by companies like Alcatel, Cisco, Avaya and others.

For a detailed discussion about the basics of presence technology, reference is made to the following documents:

Jack Jachner et at. "Rich Presence: A New User Communications Experience" Technology White Paper, 8 pages, copyrighted 1st quarter 2005.

J. Rosenberg, "A Data Model for presence", draft-ietf-simple-data-model-05 (work in progress), Sep. 22, 2005.

Rosenberg, J. "A presence Event package for the Session initiation protocol (SIP)", RFC 3856, August 2004.

H. Shulzerine et al. "RPID: Rich Presence Extensions to the presence Information Data Format (PIDF)", draft-ietf-simple-rpid-08, (work in progress), Jul. 16, 2005.

Rosenberg, J. "Presence Authorization Rules", draft-ietf-simple-presence-rules-03 (work in progress), Jul. 20, 2005.

The Contents of these Documents are Incorporated by Reference herein.

A basic idea of the present invention is for the web service providers to publish their dynamic presence information and for the web service consumers to obtain and use this presence information. The published dynamic presence information can include attributes like (for example):

Availability of the web service provider: whether the web service is currently up and providing the requested web service.
Current load of servers of the web service providers.
Performance indicators such as waiting time.
For mobile entities that provide web services, the entities location.
Prices.
Etc.

The web service consumers use the presence information to choose a web service based on important factors such as load, price, location, etc. . . . which makes the web service more efficient and user-centric. Implementing the present invention requires leveraging the presence services technology infrastructure. Two embodiments that can be used to leverage the presence services technology infrastructure in accordance with the present invention are described below with respect to FIGS. 3 and 4.

Figure 3:
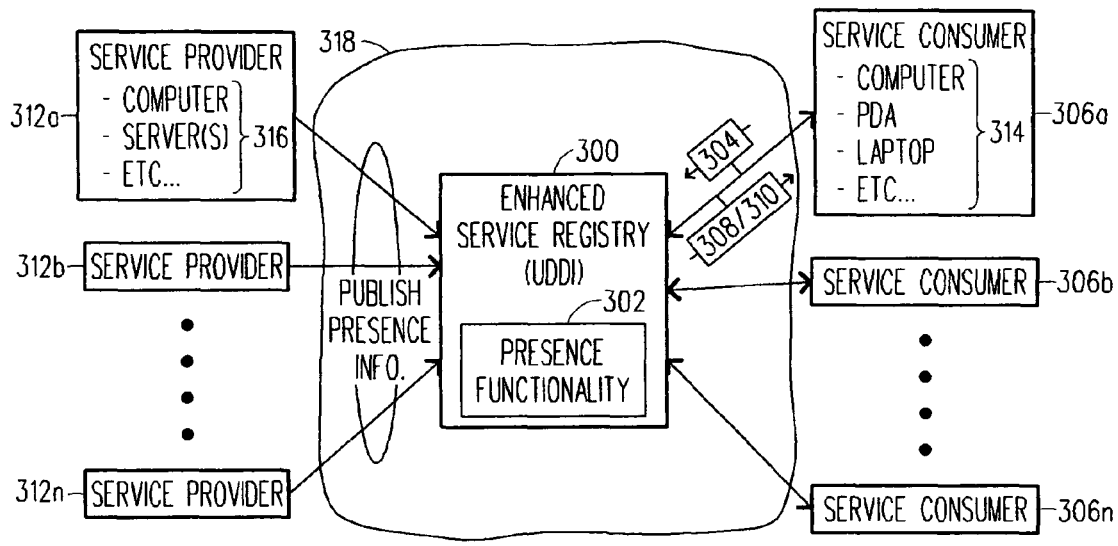
FIG. 3 is a block diagram of an enhanced service registry (e.g., enhanced UDDI service registry) that has a presence functionality so it can provide presence information in addition to business/technical information about different web service providers to consumers so they can select and interact with one or more web service providers in accordance with one embodiment of the present invention.

Referring to FIG. 3, there is shown a block diagram of an enhanced service registry 300 (e.g., enhanced UDDI service registry 300) in accordance with one embodiment of the present invention. The enhanced UDDI service registry 300 (which is a distributed mechanism) has a presence functionality 302 so it can upon receiving a search request 304 from any of the consumers 306a, 306b . . . 306n effectively provide them presence information 308 and business/technical information 310 about the relevant web service providers 312a, 312b . . . 312n. The consumers 306a, 360b . . . 306n can then choose the web service of one or more of the web service providers 312a, 312b . . . 312n based on important factors such as load, price, location etc. . . .

In particular, the consumer 306a (for example) uses a computer 314 (PDA, laptop etc. . . . ) with software loaded therein that can communicate via WSDL with the enhanced UDDI service registry 300. And, the web service providers 312a, 312b . . . 312n use equipment 316 (computer, server etc. . . . ) with software loaded therein that can communicate via WSDL with the enhanced UDDI service registry 300. The consumers 306a, 306b . . . 306n, the web service providers 312a, 312b . . . 312n and the enhanced UDDI service registry 300 communicate with one another via the Internet 318.

Each web service provider 312a, 312b . . . 312n registers their company/services with the enhanced UDDI service registry 300. In particular, each web service provider 312a, 312b . . . 312n can register with the enhanced UDDI service registry 300 and publicly list information about their products, services and engagement guidelines. This information is referred to herein as business/technical information 310. And, each web service provider 312a, 312b . . . 312n publishes their presence information 308 to the presence functionality 302 located within the enhanced UDDI service registry 300. Again, the published dynamic presence information can include attributes like (for example):

Availability of the web service provider: whether the web service is currently up and providing the requested web service.
Current load of servers of the web service providers.
Performance indicators such as waiting time.
For mobile entities that provide web services, the entities location.
Prices.
Etc.

Figure 1:
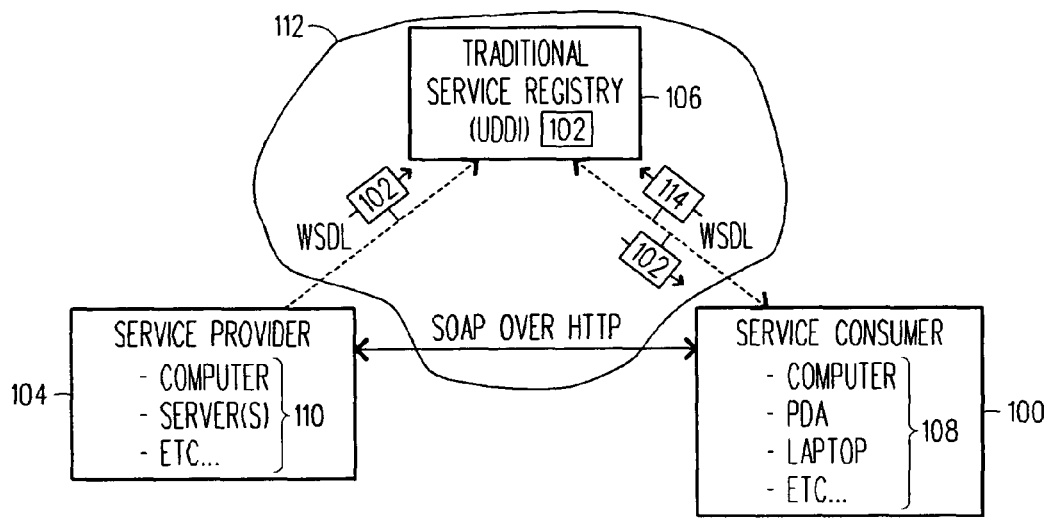
FIGS. 1 and 2 (PRIOR ART) are two block diagrams which are used to help describe how a traditional service registry (e.g., traditional UDDI service registry) can provide business/technical information about different web service providers to consumers so they can select and interact with one or more web service providers.
Figure 2:
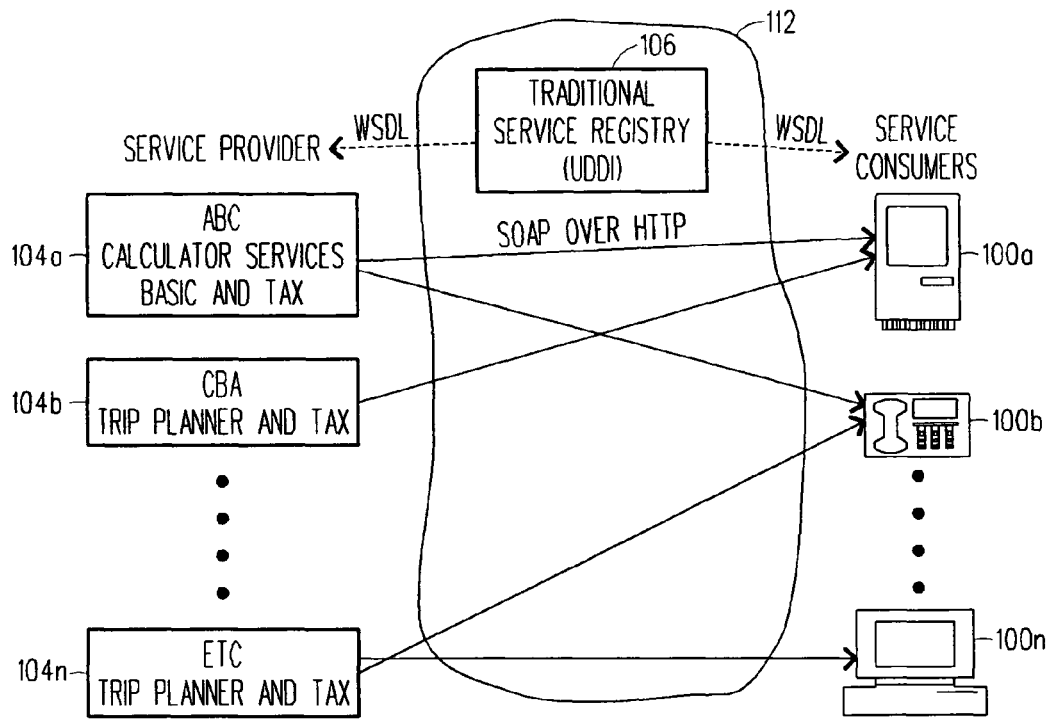

Then, the consumer 306a (for example) sends a specific search request 304 to the enhanced UDDI service registry 300 to obtain presence information 308 and business/technical information 310 about the relevant web service providers 312a, 312b . . . 312n. For example, the consumer 306a can send a search request 304 to obtain presence information 308 and business/technical information 310 about web service providers 312a, 312b . . . 312n that provide tax planning services. The consumer 306a before being able to send the search request 304 would first need to access the enhanced UDDI service registry 300. For example, the consumer 306a can do this by using anyone of the following URLS:

IBM's UBR Node: http://uddi.ibm.com
Microsoft's UBR Node: http://uddi.microsoft.com
SAP's UBR Node: http://uddi.sap.com
NTT's UBR Node: http://uddi.ntt.com The consumer 306a then reviews the presence information 308 and business/technical information 310 and selects one of the web service providers 312a (for example). At this point in time, the consumer 306a and the selected web service provider 312a can interact directly with one another and they no longer need to utilize the enhance UDDI service registry 300 (e.g., see FIG. 2).

This embodiment of the present invention has several advantages and disadvantages some of which are provided below:

Advantages

Web service providers 312a, 312b . . . 312n and web service consumers 306a, 306b . . . 306n do not need to implement a presence service. They can simply use the enhanced UDDI service registry 300.

The enhanced UDDI service registry 300 can have a functionality that supports a query from consumers 306a, 306b . . . 306n: "give the lightly loaded provider" or "give the nearest provider". In this way, the consumers 306a, 306b . . . 306n do not need to review all of the presence information 308 and business/technical information 310. Instead, the enhanced UDDI service registry 300 can effectively select a web service provider 312a (for example) for customer 306a (for example).

Disadvantages

The enhanced UDDI service registry 300 may become overloaded as presence information 308 may change frequently. The enhanced UDDI service registry 300 may become a hotspot.

It may be difficult to maintain the consistency of the presence information 308 since the enhanced UDDI service registry 300 is made up of distributed UBR nodes.

The enhanced UDDI service registry 300 may use a presence functionality 302 that does not have all of the capabilities and features of a traditional presence system.

Figure 4:
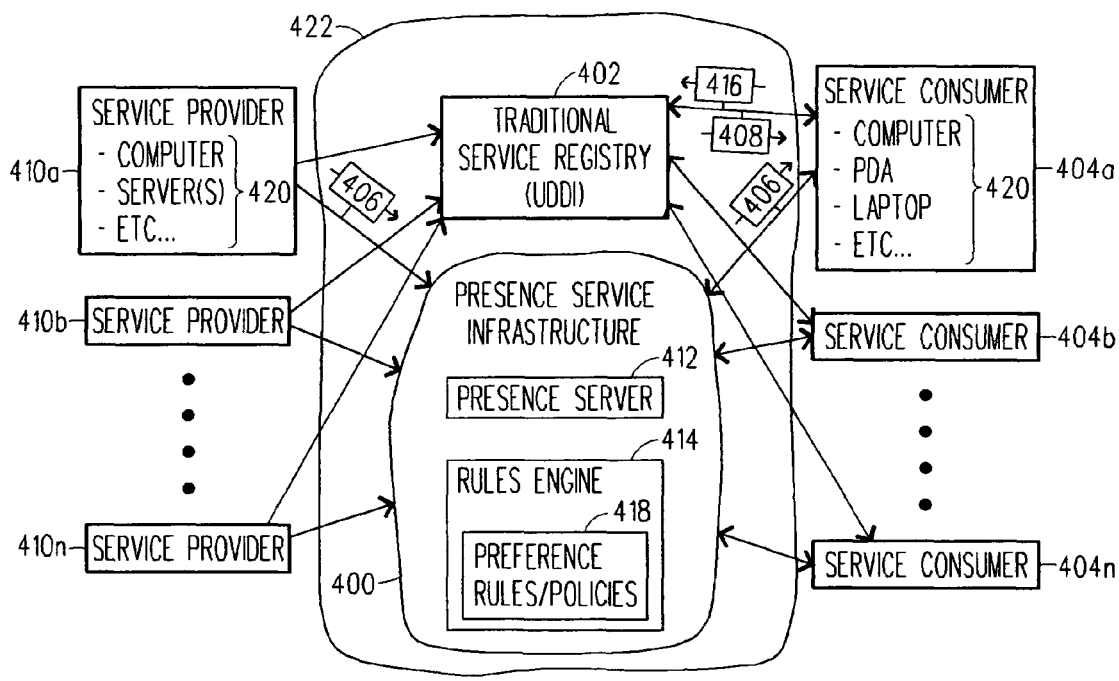
FIG. 4 is a block diagram of a presence system and a traditional service registry (e.g., traditional UDDI service registry) that respectively provides presence information and business/technical information about different web service providers to consumers so they can select and interact with one or more web service providers in accordance with another embodiment of the present invention.

Referring to FIG. 4, there is shown a block diagram of a presence system 400 that works in conjunction with a traditional service registry 402 (e.g., traditional UDDI service registry 402) to provide consumers 404a, 404b . . . 404n both presence information 406 and business/technical information 408 about one or more web service providers 410a, 410b . . . 410n in accordance with another embodiment of the present invention. The presence system 400 (shown as presence service infrastructure 400) includes a presence server 412 and a rules engine 414 (optional). The presence server 412 collects presence information 406 about one or more states of the web service providers 410a, 410b . . . 410n and publishes at least a portion of that presence information 406 to one or more of the consumers 404a, 404b . . . 404n. In this embodiment, the consumers 404a, 404b . . . 404n may need to subscribe with the presence server 412 before they can receive the presence information 404 of selected web service providers 410a, 410b . . . 410n. Again, the published dynamic presence information can include attributes like (for example):

Availability of the web service provider: whether the web service is currently up and providing the requested web service.

Current load of servers of the web service providers.

Performance indicators such as waiting time.

For mobile entities that provide web services, the entities location.

Prices.

Etc.

The traditional UDDI service registry 402 upon receiving a search request 416 from any of the consumers 404a, 404b . . . 404n provides them the business/technical information 408 about the relevant web service providers 410a, 410b . . . 410n. The consumers 404a, 404b . . . 404n can review the presence information 406 and business/technical information 408 and then select one or more of the web service providers 410a, 410b . . . 410n. In an alternative embodiment, the traditional UDDI service registry 402 is not used because the consumers 404a, 404b . . . 404n already know the relevant web service providers 410a, 410b . . . 410n. In this case, the consumers 404a, 404b . . . 404n would obtain only the presence information 406 and then select one or more of the web service providers 410a, 410b . . . 410n.

If the presence system 400 also uses the rules engine 414, then it would be possible to select which presence information 406 if any should be made available to certain customers 404a, 404b . . . 404n. To accomplish this, the rules engine 414 would aggregate the presence information 406 collected from web service providers 410a, 410b . . . 410n and analyze the collected presence information 406 in view of stored preference rules/policies 418. The preference rules/policies 418 function to dictate which if any of presence information 406 should be sent to particular customers 404a, 404b . . . 404n. The web service providers 410a, 410b . . . 410n can establish their own preference rules/policies 418. For example, the rules engine 414 can use the preference rules/policies 418 to learn that a particular web service provider's presence information 406 should not be published to customer 404b (for example) because this customer 404b has not paid the service provider's bill. In addition, the rules engine 414 can use the preference rules/policies 418 to output aggregated/filtered presence information 406 that is adapted to (for example):

The identity of the particular customer 404a, 404b . . . 404n and the relationship between particular customer 404a, 404b . . . 404n and the web service provider 410a, 410b . . . 410n.

The privacy preferences of the web service provider 410a, 410b . . . 410n.

The policies of the web service provider 410a, 410b . . . 410n.

Security considerations.

Etc.

In operation, the consumer 404a (for example) uses a computer 420 (PDA, laptop etc. . . . ) with software loaded therein that can communicate via WSDL with the traditional UDDI service registry 402. And, the web service providers 410a, 410b . . . 410n use equipment 420 (computer, server etc. . . . ) with software loaded therein that can communicate via WSDL with the traditional UDDI service registry 402. The consumers 404a, 404b . . . 404n, the web service providers 410a, 410b . . . 410n and the traditional UDDI service registry 402 communicate with one another via the Internet 422.

Each web service provider 410a, 410b . . . 410n registers their company/services with the traditional UDDI service registry 402. In particular, each web service provider 410a, 410b . . . 410n can register with the traditional UDDI service registry 402 and publicly list information about their products, services and engagement guidelines. And, each web service provider 410a, 410b . . . 410n can publish their presence information 406 (see above list) to the presence system 400. In one version, the consumer 404a (for example) can access the traditional UDDI service registry 402 (as discussed above) and send a specific search request 416 to the traditional UDDI service registry 402 to obtain business/technical information 408 about the relevant web service providers 410a, 410b . . . 410n. For example, the consumer 404a can send a search request 416 to obtain business/technical information 408 about web service providers 410a, 410b . . . 410n that provide tax planning services. In another version, the consumer 404a (for example) would already know the relevant web service providers 410a, 410b . . . 410n and would not need to interact with the traditional UDDI service registry 402 instead they would just interact with the presence system 400. In both versions, the consumer 404a if they have not already done so may need to subscribe with the presence system 400 to obtain the presence information 406 about the relevant web service providers 410a, 410b . . . 410n. However, before the consumer 404a can subscribe with the presence system 400, they may need to obtain the address of the presence system 400. For instance, this address can be a well-known address like the well-known URLS for the UBR nodes. Or, this address can be part of the business/technical information 408 that is provided by the traditional UDDI service registry 402 to the consumer 404a in response to their specific query 416.

The consumer 404a then reviews the presence information 406 and business/technical information 408 (if needed) and selects one or more of the web service providers 410a, 410b . . . 410n. At this point in time, the consumer 404a and the selected web service provider 410a (for example) can interact directly with one another and no longer need to utilize the presence system 400 and the traditional UDDI service registry 402 (e.g., see FIG. 2).

This embodiment of the present invention has several advantages and disadvantages some of which are provided below:

Advantages

Leveraging a presence service infrastructure 400 that is independent from the UDDI service registry 402 implies an easier deployment. As mentioned earlier, several communication service companies such as Alcatel, Nortel, and Nokia are building presence service infrastructures 400.

Reduces the possibility of Hotspots.

The ideas developed by IETF SIMPLE workgroup to distribute Presence over SIP can be leveraged. In this case, the presence server 412 would be a SIP/SIMPLE presence server 412.

The ideas developed by JABBER to distribute Presence over XML can be leveraged. In this case, the presence server 412 would be a JABBER presence server 412.

Disadvantages

The web service providers 410a, 410b . . . 410n and web service consumers 404a, 404b . . . 404n need to implement the presence service infrastructure 400.

Following are some additional features, advantages and uses of the present invention:

A consumer can watch the presence information on different servers used by a web service provider and choose the best server which has the shortest response time. For example, a consumer can select the best server associated with a financial planning web service provider.

Automatic load balancing as consumers normally choose lightly loaded systems.

The present invention can be used to distribute consumers among co-operating service providers based on a given agreed upon criteria.

The present invention can provide presence information about competing web service providers such as information related to price and response time that can be used to the advantage of a consumer.

It should be appreciated that for clarity the description provided herein about the traditional UDDI service registry and the presence service infrastructure/functionality omits certain details and components that are well known in the industry and are not necessary to understand the present invention.

Although several embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A method for delivering and deploying a plurality of requested web services to a consumer, said method comprising the steps of:
    providing business/technical information about a plurality of web service providers to said consumer; and
    providing dynamic presence information about a current state of each web service provider to said consumer, the dynamic presence information including attributes defining a technology infrastructure of each web service provider, to allow said consumer to review the business/technical information and the dynamic presence information and select one of the web service providers to deliver and deploy the requested web services, the selection based upon factors within the provided information.

2. The method of claim 1, wherein:
    an enhanced service registry, which has a presence functionality, provides both the business/technical information and the dynamic presence information to the consumer.

3. The method of claim 1, wherein:
    a service registry provides the business/technical information to the consumer; and
    a presence service infrastructure system provides the dynamic presence information to the consumer.

4. The method of claim 1, wherein said dynamic presence information includes technology infrastructure information about at least one of the following current states:
    availability of a web service provider;
    current load of servers associated with the web service provider;
    performance indicators of the web service provider, including waiting time for the requested services;
    location of servers associated with the web service provider; and/or
    prices for the services requested by the consumer.

5. An enhanced web service registry, comprising:
    a node for providing business/technical information about a plurality of web service providers to a consumer, wherein said node includes a presence functionality, and further provides dynamic presence information about a current state of each web service provider, the dynamic presence information including attributes defining a technology infrastructure of each web service provider, to allow said consumer to review the business/technical information and the dynamic presence information and select one of the plurality of web service providers to deliver and deploy a plurality of requested web services, the selection based upon factors within the provided information.

6. The enhanced web service registry of claim 5, wherein said node is a distributed node.

7. The enhanced web service registry of claim 5, wherein said dynamic presence information includes technology infrastructure information associated with at least one of the following current states:
    availability of a web service provider;
    current load of servers associated with the web service provider;
    performance indicators of the web service provider, including waiting time for the requested services;

location of servers associated with the web service provider; and/or prices for the services requested by the consumer.

8. A presence service infrastructure system, comprising:
a presence server that collects dynamic presence information about one or more current states including attributes defining a technology infrastructure of each web service provider of a plurality of web service providers, and then publishes at least a portion of that dynamic presence information for each web service provider to a consumer requesting a plurality of specific web services, allowing the consumer to select a web service provider based upon factors within the dynamic presence information important to the consumer.

9. The presence service infrastructure system of claim 8, further comprising:
a rules engine that applies preference rules/policies to the collected dynamic presence information to determine which of the collected dynamic presence information is to be published to said consumer.

10. The presence service infrastructure system of claim 9, wherein each web service provider establishes its own preference rules/policies.

11. The presence service infrastructure system of claim 8, wherein said consumer subscribes with said presence server to receive the dynamic presence information of the web service providers.

12. The presence service infrastructure system of claim 8, wherein said dynamic presence information of each web service provider includes technology infrastructure information about at least one of the following current states:
availability of a web service provider;
current load on servers associated with the web service provider;
performance indicators of the web service provider, including waiting time for the requested services;
location of servers associated with the web service provider; and/or
prices for the services requested by the consumer.

13. The presence service infrastructure system of claim 8, wherein the presence server is a SIP/SIMPLE presence server.

14. The presence service infrastructure system of claim 8, wherein the presence server is a JABBER presence server.

15. The presence service infrastructure system of claim 8, wherein the consumer obtains business/technical information about the web service providers from a web service registry and uses the business/technical information and the dynamic presence information to help select one of the web service providers to deliver and deploy the requested web services.

16. The presence service infrastructure system of claim 15, wherein said web service registry is a UDDI web service registry.

* * * * *